United States Patent [19]

Ohga

[11] Patent Number: 5,712,925
[45] Date of Patent: Jan. 27, 1998

[54] IMAGE PROCESSING SYSTEM WHICH MAPS COLOR IMAGE SIGNALS WITHIN A REPRODUCTION RANGE OF AN OUTPUT DEVICE

[75] Inventor: Manabu Ohga, Yokohama, Japan

[73] Assignee: Canon Kabushiki Kaisha, Tokyo, Japan

[21] Appl. No.: 314,903

[22] Filed: Sep. 29, 1994

[30] Foreign Application Priority Data

Sep. 29, 1993 [JP] Japan .................................. 5-242962

[51] Int. Cl.$^6$ .................................................. H04N 1/60
[52] U.S. Cl. ................................................ 382/167; 358/518
[58] Field of Search ................................ 358/518, 519, 358/520, 523, 525, 530; 395/109, 131; 382/167

[56] References Cited

U.S. PATENT DOCUMENTS

| | | |
|---|---|---|
| 4,731,662 | 3/1988 | Udagawa et al. ...................... 358/530 |
| 5,237,409 | 8/1993 | Yamaguchi ............................ 358/518 |
| 5,239,370 | 8/1993 | Yamaguchi ............................ 358/518 |
| 5,282,046 | 1/1994 | Yamaguchi ............................ 358/518 |
| 5,299,291 | 3/1994 | Ruetz .................................... 395/109 |
| 5,319,473 | 6/1994 | Harrington ............................ 358/518 |

*Primary Examiner*—Scott A. Rogers
*Attorney, Agent, or Firm*—Fitzpatrick, Cella, Harper & Scinto

[57] ABSTRACT

It is an object of the invention to provide image processing method and apparatus in which by controlling a mapping boundary on the basis of input color signals, even in an area out of a device color reproduction area, a good color image can be reproduced while keeping a color continuity. When it is assumed that an area to reproduce the input color signals at a high fidelity in the device color reproduction area is set to a fidelity color reproduction area and that an area to map the input color signals out of the fidelity color reproduction area is set to a mapping color reproduction area, a mapping boundary as a boundary of those two areas is determined on the basis of the input color signals.

25 Claims, 8 Drawing Sheets

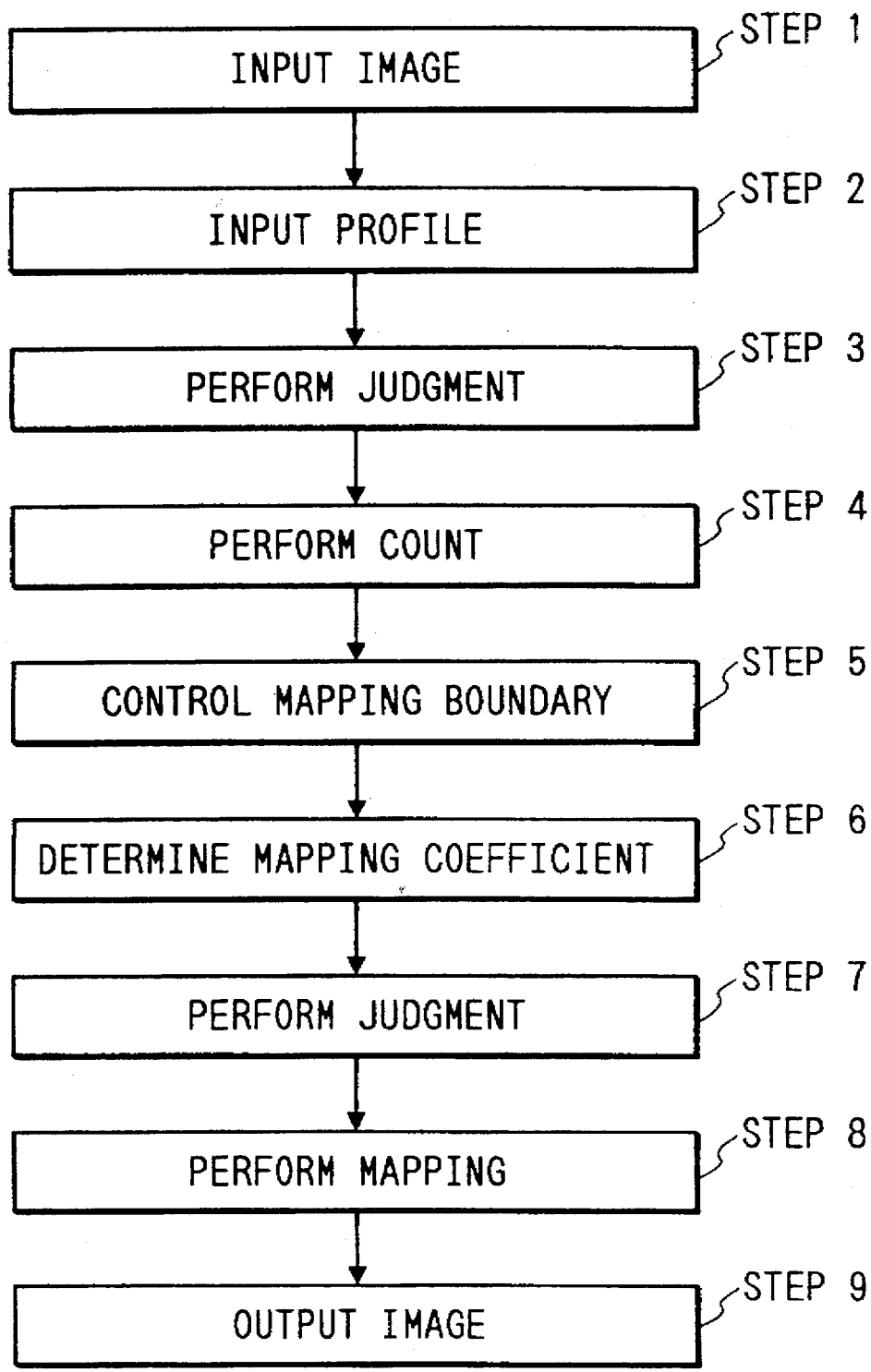

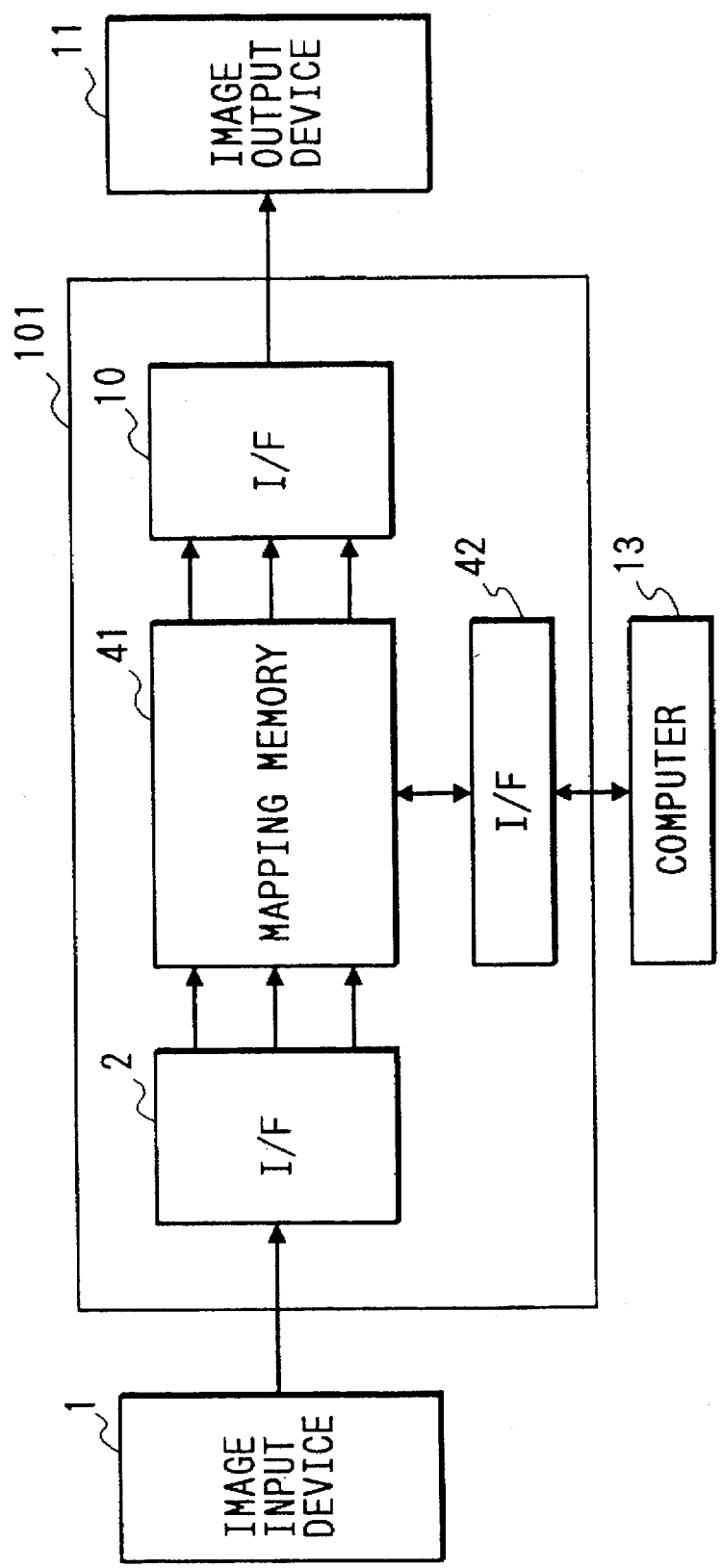

IMAGE PROCESSING SYSTEM WHICH MAPS COLOR IMAGE SIGNALS WITHIN A REPRODUCTION RANGE OF AN OUTPUT DEVICE

BACKGROUND OF THE INVENTION

1. Field of the Invention

The invention relates to image processing method and apparatus for converting a color space of image data in accordance with a color reproduction area of an image output apparatus.

2. Related Background Art

A conventional color space compressing method is mainly classified into the following two methods as shown in conceptual diagrams of FIGS. 5A and 5B.

(a) As shown in FIG. 5A, whole color signals are equivalently compressed so that input color signals existing in the outside of a color reproducible area (hereinafter, referred to as a "device color reproduction area") of a processing device such as monitor, printer, or the like enter the area, and the compressed color signals are mapped to the device color reproduction area.

(b) As shown in FIG. 5B, color signals in the device color reproduction area are not changed but color signals out of the device color reproduction area are mapped onto the device color reproduction area surface.

The conventional image processing method, however, has the following drawbacks. Namely, although the above method (a) has an advantage such that the color balance is not broken because the relative relation of the color signals which are input is held, there is a drawback such that the whole color changes. Particularly, in the case where the number of color signals out of the device color reproduction area is small, there is a drawback such that the area in which the color can be reproduced at a high fidelity is also broken and an output image having a good gradation cannot be obtained.

Although the above method (b) has an advantage such that the color signals in the device color reproduction area are reproduced at a high fidelity, there is a drawback such that the whole gradation property is lost because all of the color signals out of the device color reproduction area are broken on the surface of the device color reproduction area.

Therefore, hitherto, in case of performing a hard copy, soft copy, or the like of an original image, there is a problem such that the color of an original document or the color of the image data of an original is not reproduced at a high fidelity on the printer side but is reproduced by a color different from that of the original image.

The assignor of the present invention has also proposed the method of spatially compressing in accordance with input image data in U.S. Pat. No. 4,731,662. According to the above method, however, there is a drawback such that when the color space compression is performed, the color changes as a whole, so that it is still necessary to improve such a drawback.

The assignor also has proposed the method of changing the process in accordance with the input image data in U.S. patent application Ser. No. 792,154 (filed on Nov. 14, 1991). Since the process is set on the basis of an influence that is exerted on the image by the pixels in the color reproduction range, however, it is also necessary to improve such a drawback.

SUMMARY OF THE INVENTION

It is an object of the invention to provide image processing apparatus and method which can solve the above problems.

Another object of the invention is to provide image processing method and apparatus which can reproduce a good color image while keeping a color continuity even in an area out of a device color reproduction area.

To accomplish the above objects, there is provided an image processing method in which when it is assumed that an area to reproduce input color signals at a high fidelity in a color reproducible area of a processing device is set to a fidelity color reproduction area and that an area to map input color signals out of the fidelity color reproduction area is set to a mapping color reproduction area, a mapping boundary as a boundary of those two areas is determined on the basis of the input color signals.

Still another object of the invention is that the control of a mapping boundary is certainly performed by controlling the mapping boundary in accordance with the number of pixels out of a predetermined color space in input color signals.

To accomplish the above object, there is provided an image processing method comprising: when it is now assumed that an area to reproduce input color signals at a high fidelity in a color reproducible area of a processing device is set to a fidelity color reproduction area and that an area to map input color signals out of the fidelity color reproduction area is set to a mapping color reproduction area, a mapping boundary control step of controlling a mapping boundary as a boundary of those two areas; a judging step of judging whether the input signals exist out of the mapping boundary or not; and a mapping step of mapping the input color signals which were determined such that they exist out of the mapping boundary to the mapping color reproduction area.

According to another aspect of the present invention, there is provided an image processing method comprising: a judging step of judging whether input color signals exist in a predetermined color space area or not; a counting step of counting the number of pixels which were determined by the judging step such that the input color signals exist out of the predetermined color space area; when it is assumed that an area to reproduce the input color signals at a high fidelity in a color reproducible area of a processing device is set to a fidelity color reproduction area and that an area to map input color signals out of the fidelity color reproduction area is set to a mapping color reproduction area, a mapping control step of controlling a mapping boundary of those two areas in accordance with a count value of counting means; and a mapping step of mapping the input color signals on the basis of the mapping boundary.

Further another object of the invention is to enable a mapping to be performed in accordance with a feature of an input image by controlling a mapping boundary on the basis of a value of a special input color signal of an input image.

To accomplish the above object, there is provided an image processing method whereby when it is assumed that an area to reproduce input color signals at a high fidelity in a color reproducible area of a processing device is set to a fidelity color reproduction area and that an area to map input color signals out of the fidelity color reproduction area is set to a mapping color reproduction area, the method has a mapping step of mapping the input color signals which were determined such that they exist out of the mapping boundary to the mapping color reproduction area on the basis of the position of the mapping boundary as a boundary of those two areas and the value of a special input color signal indicative of a feature of an input image.

Further another object of the invention is to decrease a load in image processes of a printer and to reduce a time that is required for the image processes.

To accomplish the above object, there is provided an image processing apparatus having communicating means between an external input device and an external output device, comprising: first input means for inputting image data; calculating means for calculating color correction parameters for the image data on the basis of the image data and profile information of the external output device; and output means for outputting the color correction parameters to the external output device.

The above and other objects and features of the present invention will become apparent from the following detailed description and the appended claims with reference to the accompanying drawings.

BRIEF DESCRIPTION OF THE DRAWINGS

FIG. 2 is a flowchart showing a flow of processes in the first embodiment of the invention;

FIG. 10 is a block diagram showing a construction of an image processing circuit of the third embodiment.

DETAILED DESCRIPTION OF THE PREFERRED EMBODIMENTS

Embodiments of the present invention will now be described hereinbelow with reference to the drawings.

[First embodiment]

Figure 1:
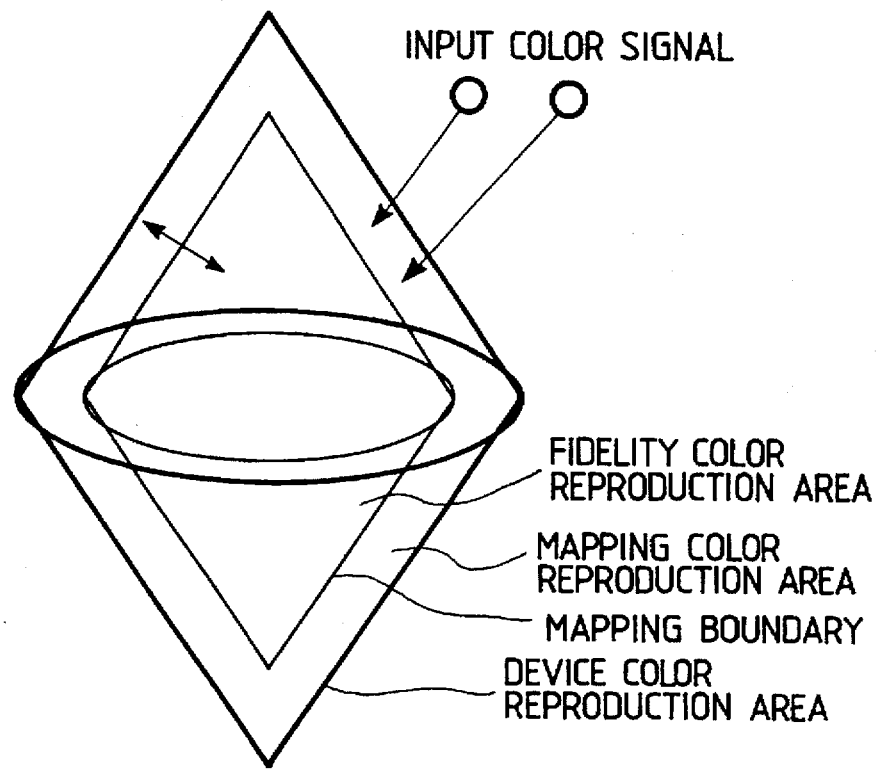
FIG. 1 is a conceptual diagram of an embodiment of the invention.

FIG. 1 shows a conceptual diagram of the invention. FIG. 2 is a flowchart showing a flow of processes.

FIG. 1 shows that a fidelity color reproduction area and a mapping color reproduction area exist in a device color reproduction area and a mapping boundary as a boundary of those two areas is controlled in accordance with an input image and input color signals out of the mapping boundary are mapped to the mapping color reproduction area.

In FIG. 2:

in step 1, an image is input from an image input device such as image scanner, video camera, CG editor, image file, or the like;

in step 2, data (hereinafter, referred to as a "profile") indicative of image reading characteristics of the image scanner and characteristics of an image output device such as device color reproduction area of a monitor, printer, or the like, γ curve of the monitor, and the like is input;

in step 3, a check is made to see if each pixel of the image that is expressed by the color signal input in step 1 exists in a certain area of a color space coordinate system or not;

in step 4, the number of pixels which were judged in step 3 such that they exist out of the device color reproduction area which had been input in step 2 is counted;

in step 5, the position of the mapping boundary is determined from a ratio of the number of pixels out of the device color reproduction area obtained in step 4 and the number of all pixels;

in step 6, mapping coefficients, namely, coefficients to map the color signals out of a mapping boundary to the mapping color reproduction area are obtained from the value of the relative position of the pixel that gives the largest influence when performing a color space compression among the pixels which were determined in step 3 such that they exist out of the device color reproduction area, namely, the pixel such that the relative position to the boundary of the device color reproduction area has the largest value and the position of the mapping boundary determined in step 5;

in step 7, a check is made to see if the input color signals exist out of the mapping boundary determined in step 5 or not;

in step 8, the color signals which were determined in step 7 such that they exist out of the mapping boundary are mapped to an area between the mapping boundary and the device color reproduction area by, for example, an arithmetic operation, which will be explained hereinlater, by using the mapping coefficients obtained in step 6; and in step 9, the image derived in step 7 is output to an image output device such as monitor, printer, or the like.

A process that is executed in each step with respect to each pixel of the image input in step 1 will now be specifically explained hereinbelow.

(Judgment about in/out of device color reproduction area)

In step 3, a check is made to see if the input color signals exist in the device color reproduction area or not every pixel on the basis of the profile obtained in step 2.

Figure 3:
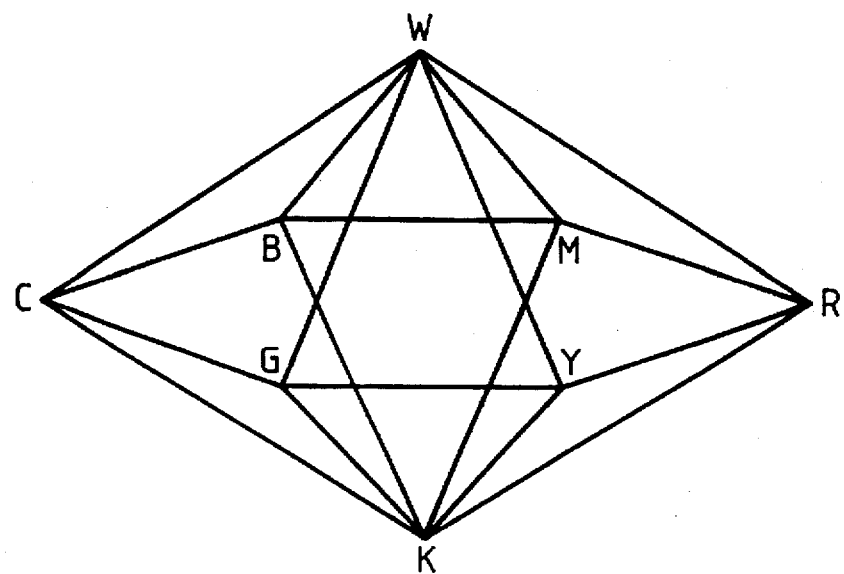
FIG. 3 is an explanatory diagram of a device color reproduction area in the embodiment of the invention.

For example, in the case where the device color reproduction area is defined by eight points of R (red), G (green), B (blue), Y (yellow), M (magenta), C (cyan), W (white), and K (black), those eight points are converted into the coordinate values of a color space coordinate system CIE LAB. The device color reproduction area is approximated by a dodecahedron which is formed by six points of R, G, B, Y, M, and C and ridgelines of W and K as shown in FIG. 3. When a point existing in the device color reproduction area for the dodecahedron, for example, a convergent point and a point of the input color signal as a target of the judgment exist on the same side, it is judged that the pixel color exists in the device color reproduction area. When those points exist on the opposite sides, it is judged that the pixel color exists in the outside of the device color reproduction area.

(Determination of mapping boundary)

The number of input color signals which were judged in step 3 such that they exist out of the device color reproduction area is counted in step 4.

Figure 6:
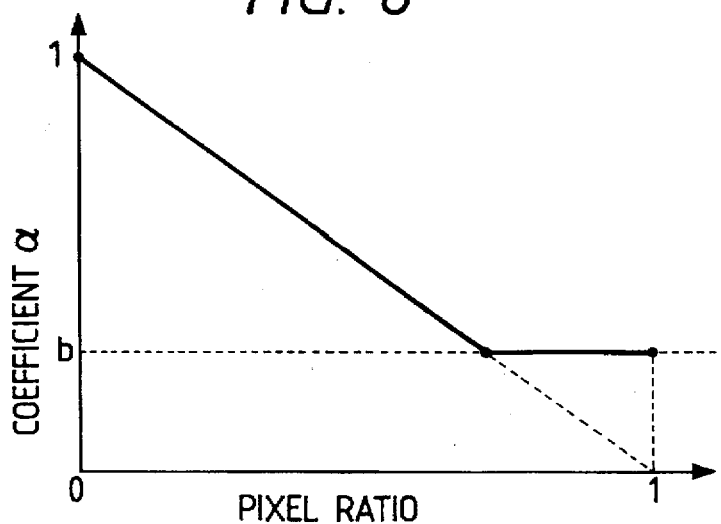
FIG. 6 is a graph showing the relation between the pixel ratio and the coefficient α.
Figure 5A:
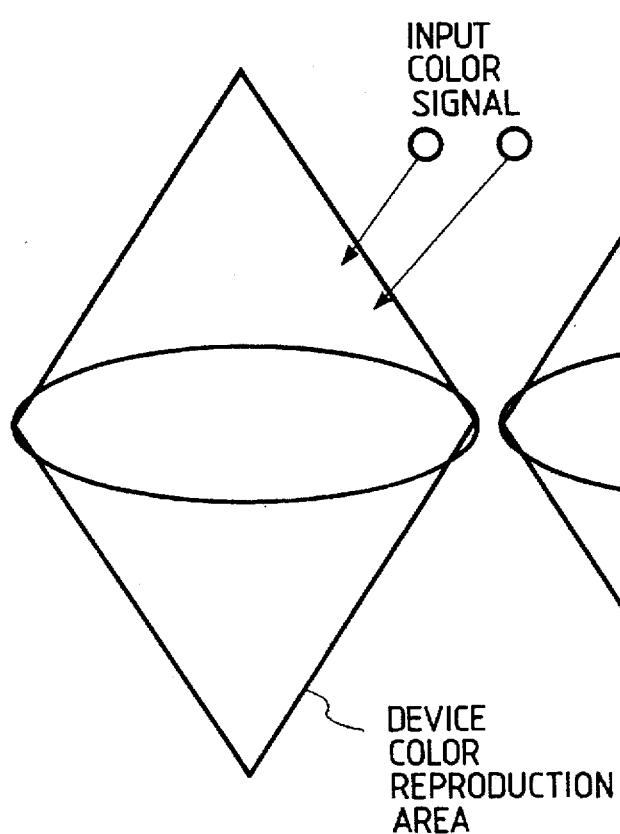
FIGS. 5A and 5B are conceptual diagrams of a conventional system.
Figure 5B:
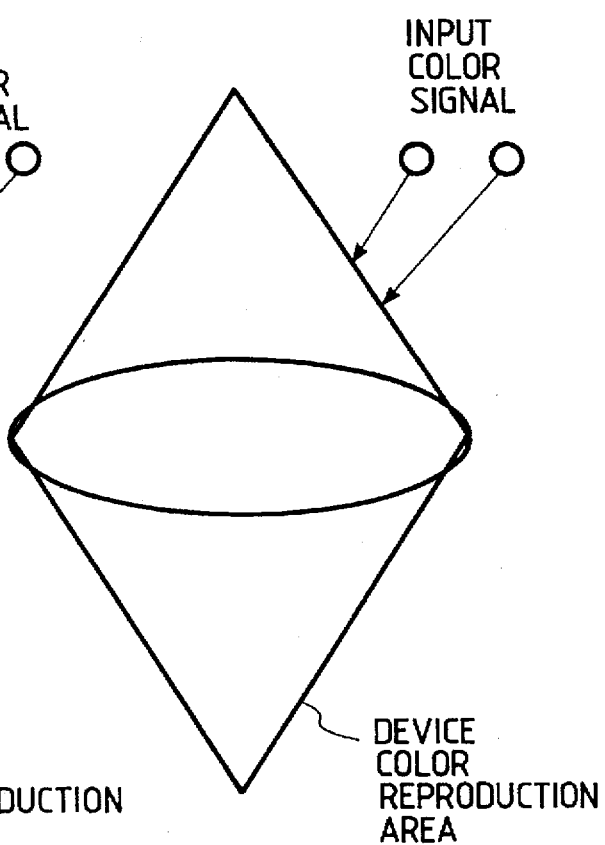

In step 5, a ratio of the number of input color signals existing out of the device color reproduction area to the number of all input color signals is calculated. A coefficient α to specify the position of the mapping boundary is controlled on the basis of the value of the ratio of the input color signals out of the area. The position of the mapping boundary is determined by multiplying to the boundary of the device reproduction area. As shown in FIG. 6, a range in which α can be set is [b ≦α≦1] (b is a predetermined constant). When the value of α calculated on the basis of the value of the ratio of the input color signals out of the area is smaller than b, the value of α is set to b as a minimum value to which α can be set.

For example, in the case where all of the input color signals exist in the device color reproduction area, the ratio of the input color signals out of the area is equal to 0 and $\alpha=1$. The mapping boundary is controlled so as to be located at the position equal to the boundary of the device color reproduction area. On the contrary, in the case where all of the input color signals exist out of the device color reproduction area, the ratio of the input color signals out of the area is equal to 1 and $\alpha=0$ on the calculation. However, since the value to which $\alpha$ can be set lies within the range of [b $\leq\alpha\leq 1$] as mentioned above, $\alpha$ is set to b as a minimum value of a and the mapping boundary is controlled so that it is located at the position reduced by multiplying b to the boundary of the device color reproduction area toward the convergent point.

The convergent point is a convergent point of the color space compression and is, for example, the center of the color space coordinate system.

As mentioned above, as the number of input color signals out of the device color reproduction area is large, $\alpha$ approaches b and the mapping boundary approaches the convergent point. Therefore, the fidelity color reproduction area decreases, the mapping color reproduction area is widened, and the input color signals out of the device color reproduction area can be mapped while keeping the continuity of the color. As the number of input color signals out of the device color reproduction area is small, $\alpha$ approaches 1 and the mapping boundary approaches the position that is equal to the device color reproduction area. Thus, the fidelity color reproduction area is widened, the mapping color reproduction area decreases, and almost of the input color signals in the device color reproduction area which can be inherently color reproduced at a high fidelity is generated as it is without changing.

(Mapping coefficients)

The mapping coefficients are determined in step 6 from the pixels which were judged in step 3 such that they exist out of the device color reproduction area.

Figure 4:
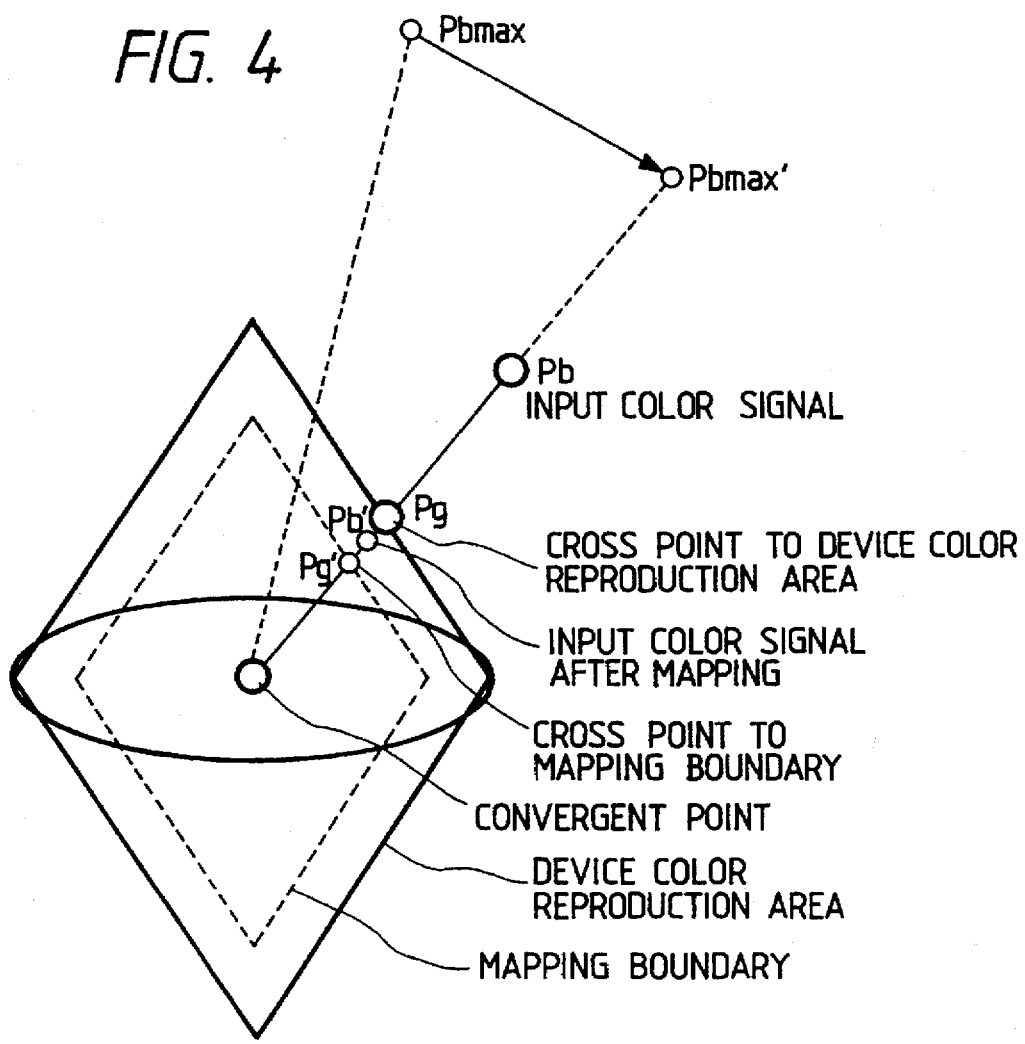
FIG. 4 is an explanatory diagram of a relative distance in the embodiment of the invention.

For example, in case of performing the color space compression along the loci connecting the color signals out of the area and the convergent point, as shown in FIG. 4, a relative position Pr of the color signal is obtained by $$Pr = Pb/Pg \qquad (1,1)$$

where,

Pg: absolute position of the cross point of the locus and the surface of the device color reproduction area Pg': absolute position of the cross point of the locus and the mapping boundary Pb: absolute position of the color signal out of the mapping boundary Pb': absolute position after the color mapping of Pb.

By calculating on the basis of the relative position, all of the input color signals are standardized by using the device color reproduction area as a reference. Thus, all of the input color signals can be compared with Pbrmax, which will be explained hereinlater, in the whole color space. The mapping process can be performed in consideration of the feature of the input image.

A relative position of Pg obtained by the equation (1,1) assumes Pgr; a relative position of Pg' assumes Pgr'; a relative position of Pb assumes Pbr; and a relative position of Pb' assumes Pbr'.

The relative positions which are obtained by the equation (1,1,) are obtained with respect to all of the color signals out of the device color reproduction area. The maximum value among them is set to a relative position Pbrmax of the color signal that is farthest from all of the device color reproduction areas.

In FIG. 4, an absolute position of Pbmax assumes Pbmax and a point at which Pbmax was moved onto the locus of the convergent point and Pb assumes Pbmax'.

The relative position Pbr' after mapping Pbr is obtained by $$Pbr'=(Pgr-Pgr')/(Pbrmax-Pgr')\times(Pbr-Pgr')+Pg' \qquad (1,2)$$

where, in the equation (1,1,), Pgr=1 and Pgr'=$\alpha$.

When both sides of the equation (1,2) by Pgr' in order to set the reference position for displaying the relative position to Pgr', a relative position Pr' of Pbr' after the color signal Pbr was mapped for the mapping boundary Pgr' is $$Pr'=Pbr'/Pgr'=(Pbr/Pgr'-1)\cdot(Pgr/Pgr'-1)/(Pbrmax/Pgr'-1)+1 \qquad (1,3)$$

Now, since Pgr=1 and Pgr'=$\alpha$ in the equation (1,1,), $$Pr'=A\cdot(Pbr-1)+1 \qquad (1,4)$$

where, A denotes a mapping coefficient and is obtained by $$A=(1/\alpha-1)/(Pbrmax/\alpha-1) \qquad (1,5)$$

In step 6, the above mapping coefficient A is determined from Pbrmax and $\alpha$ mentioned above.

Although four variables are necessary every pixel in order to calculate Pbr' in the equation (1,2), by modifying the equation (1,4), it is sufficient to use only one variable every pixel so long as the mapping coefficient A is calculated once. Therefore, by modifying the equation (1,2) to the equation (1,4), the mapping process can be efficiently performed in step 8, which will be explained hereinlater.

(Mapping)

In step 8, in the case where the input color signals are out of the mapping boundary, the input color signals are equivalently compressed by the equation (1,4) and are mapped to the mapping color reproduction range.

On the other hand, when the input color signals lie within the mapping boundary, the process to change the characteristics of the colors of the input color signals is not executed.

Since the mapping boundary is determined by executing step 5 mentioned above, by performing steps 6, 7, and 8, as the number of input color signals out of the device color reproduction area is large, the fidelity color reproduction area decreases and the mapping color reproduction area is widened. Therefore, the color signals out of the device color reproduction area can be mapped while keeping the color continuity. As the number of input color signals out of the device color reproduction area is small, the fidelity color reproduction area is widened and the mapping color reproduction area decreases. Almost of the input color signals in the device color reproduction area which can be inherently color reproduced at a high fidelity can be output as then are without changing.

Therefore, an output image that corresponds to the input image at a high fidelity is derived in the fidelity color reproduction area and an output image in which the color balance is not broken and the color continuity is held is derived in an area out of the mapping color reproduction area.

An example of the foregoing series of processes will now be described hereinbelow with respect to the case where the device color reproduction area is defined by eight points of R, G, B, Y, M, C, W, and K.

On the basis of the device color reproduction area input in step 2, a check is made in step 3 to see if the input color signals exist in the device color reproduction area or not. In step 4, the number of pixels out of the device color reproduction area is counted. In step 5, the ratio of the input color signals out of the area is obtained in step 5 and α is calculated on the basis of the value of the ratio. In step 6, the mapping coefficient is obtained from α and Pbrmax.

Now assuming that the mapping boundary is set to the position derived by reducing toward the convergent point by only α, the eight points are reduced toward the convergent point by only α in the color space coordinate system. A check is made in step 7 to see if the input color signals exist in the mapping boundary or not by those eight points.

In step 8, when the input color signals are out of the mapping boundary, the position after mapping is obtained by using the distances from the convergent point and the mapping coefficient.

For example, in case of performing the color space compression along the loci connecting the color signals out of the mapping boundary and the convergent point, the cross points between the loci and the mapping boundary are obtained, and the relative position is calculated by the equation (1,1,). By substituting the relative position into the equation (1,4), the position after mapping is subsequently obtained.

On the other hand, when the input color signals exist within the mapping boundary, the process to change the color characteristics of the input color signals is not performed.

In step 9, the image after completion of the color space compressing process is generated.

[Second embodiment]

As a second embodiment, a case where the image processing method described in the above embodiment is realized by a hardware will now be described.

Figure 7:
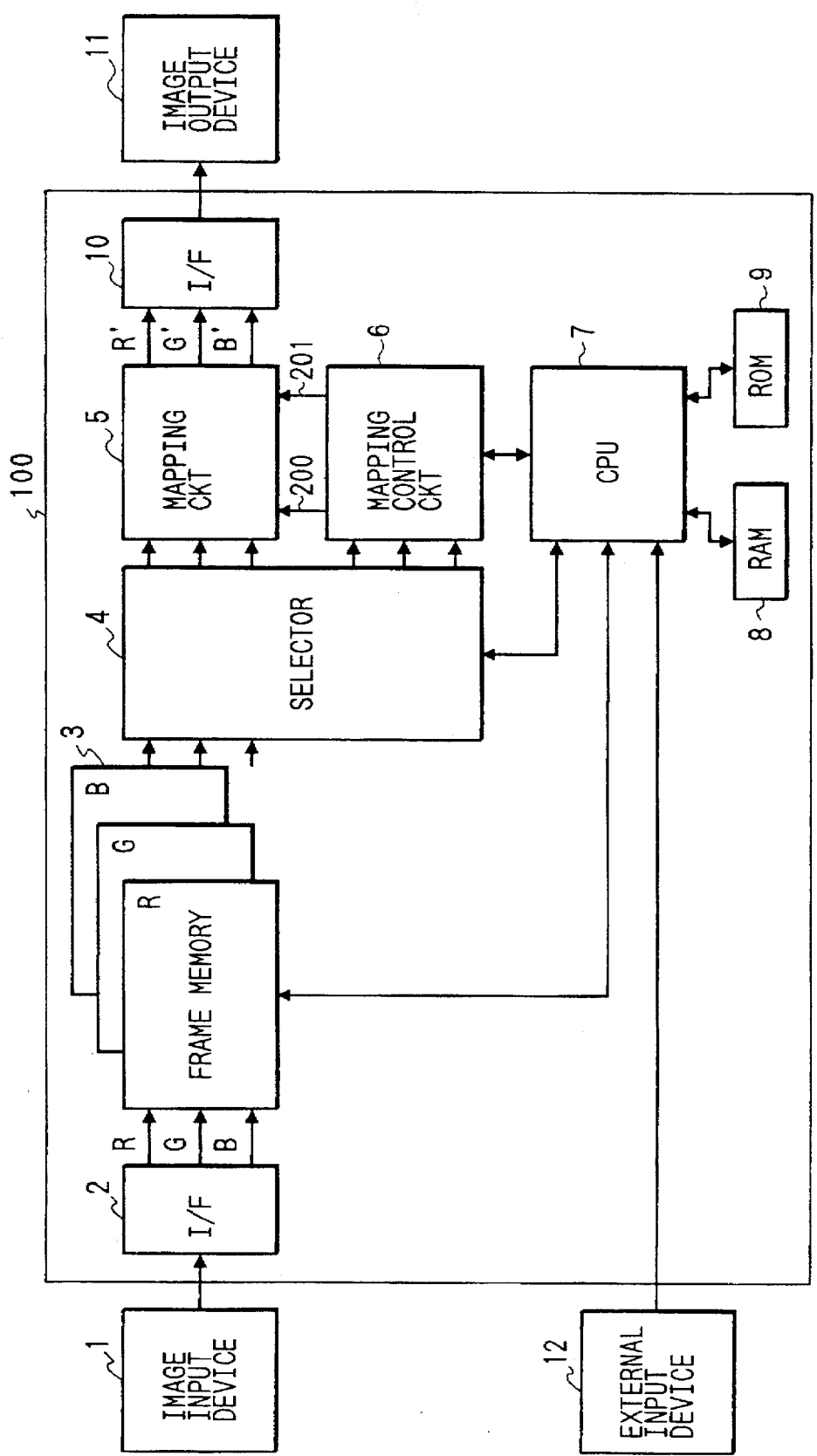
FIG. 7 is a block diagram showing a construction of an image processing circuit of the second embodiment.

FIG. 7 is a block diagram showing an example of a schematic internal construction of a system for embodying the image processing method according to the invention. The system of the embodiment comprises: an image input device 1; an image output device 11; an external input device 12 to input a profile of the image output device 11 such as device color reproduction area, γ curve of the monitor, and the like; and an image processing apparatus 100.

In the image processing apparatus 100, reference numeral 2 denotes an interface to receive color signals from the image input device 1; 3 a frame memory to store the input color signals of one frame every R, G, and B; 4 a selector for first outputting the color signals of R, G, and B from the frame memory 3 to a mapping control circuit 6 by an amount of one frame every pixel and for subsequently outputting the color signals of the same frame to a mapping circuit 5. In the mapping control circuit 6, the foregoing in/out judgment of the device color reproduction area data, determination of the mapping boundary, and calculation of the mapping coefficient are executed on the basis of the image data and the device color reproduction area data from a CPU 7 and mapping boundary data 200 and mapping coefficient data 201 are output to the mapping circuit 5. On the other hand, the mapping circuit 5 performs the foregoing mapping process on the basis of the mapping boundary data 200 and mapping coefficient data 201 which are supplied from the mapping control circuit 6 and generates color signals R', G', and B' after mapping. After all of the color signals of one frame were output from the frame memory 3 to the color mapping circuit 5, the frame memory 3 is reset by the CPU 7 and the writing operation of the new color signals is started. Reference numeral 10 denotes an interface to transmit the input color signals of R', G', and B' to the image output device 11. The CPU 7 supplies the profile data of the image output device 11 such as device color reproduction area, γ curve of the monitor, and the like from the external input device 12 stored in the RAM 8 to the mapping control circuit 6 on the basis of the program stored in the ROM 9. The CPU 7 also controls the frame memory 3, selector 4, and mapping control circuit 6.

Figure 8:
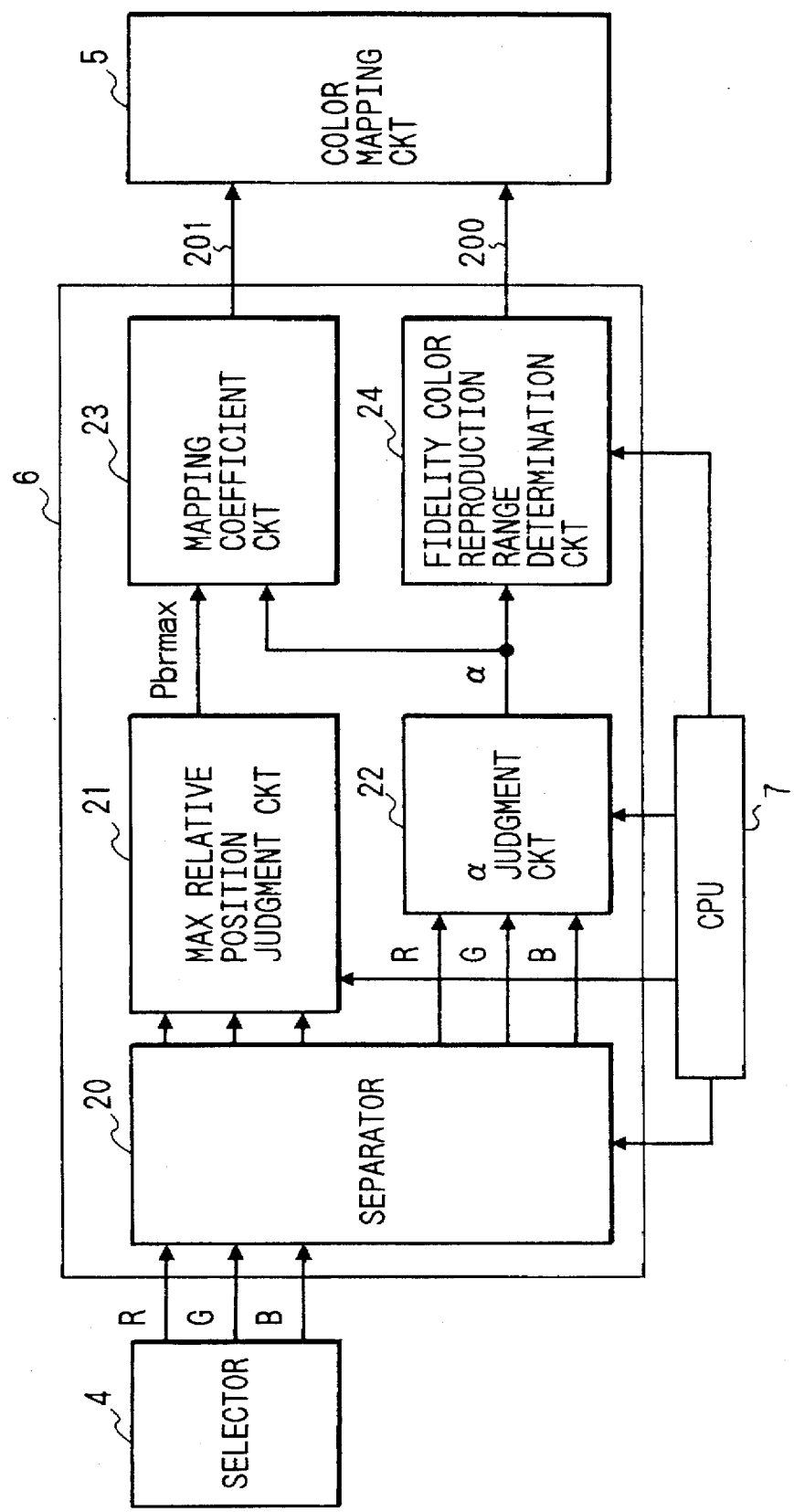
FIG. 8 is a block diagram showing a construction of a mapping control circuit 6 shown in FIG. 7.

FIG. 8 is a block diagram showing in detail a construction of the mapping control circuit 6.

A separator 20 outputs the color signals which are input from the selector 4 to both of a maximum relative position judgment circuit 21 and an α judgment circuit 22. On the basis of the absolute position color signals of R, G, and B which are input every pixel and the device color reproduction area data from the CPU 7, the max relative position judgment circuit 21 obtains the relative positions in which the device color reproduction area is set to a reference with respect to all pixels and generates the maximum relative position Pbrmax. On the other hand, the α judgment circuit 22 performs the in/out judgment of the device color reproduction area with respect to the input color signals on the basis of the count value indicative of the number of pixels which are input and the device color reproduction area data that is input from the CPU 7. The α judgment circuit 22 counts the number of pixels out of the device color reproduction area, calculates the ratio of the number of pixels out of the device color reproduction area to the number of all pixels, calculates the value of α (αmax ≦α≦1) to control the mapping boundary from the value of the ratio of the pixels out of the area, and generates the value of α. A mapping coefficient circuit 23 is a calculation circuit for executing the equation (1,5) to obtain the color mapping coefficient A from Pbrmax that is input from the judgment circuit 21 and the value of a that is input from the judgment circuit 22. The mapping coefficient circuit 23 generates the mapping coefficient A to the color mapping circuit 5. A fidelity color reproduction range determination circuit 24 obtains the fidelity color reproduction area data from the value of α that is input, the device color reproduction area data that is input from the CPU 7, and the value of α that is input from the judgment circuit 22 and supplies to the color mapping circuit 5.

Figure 9:
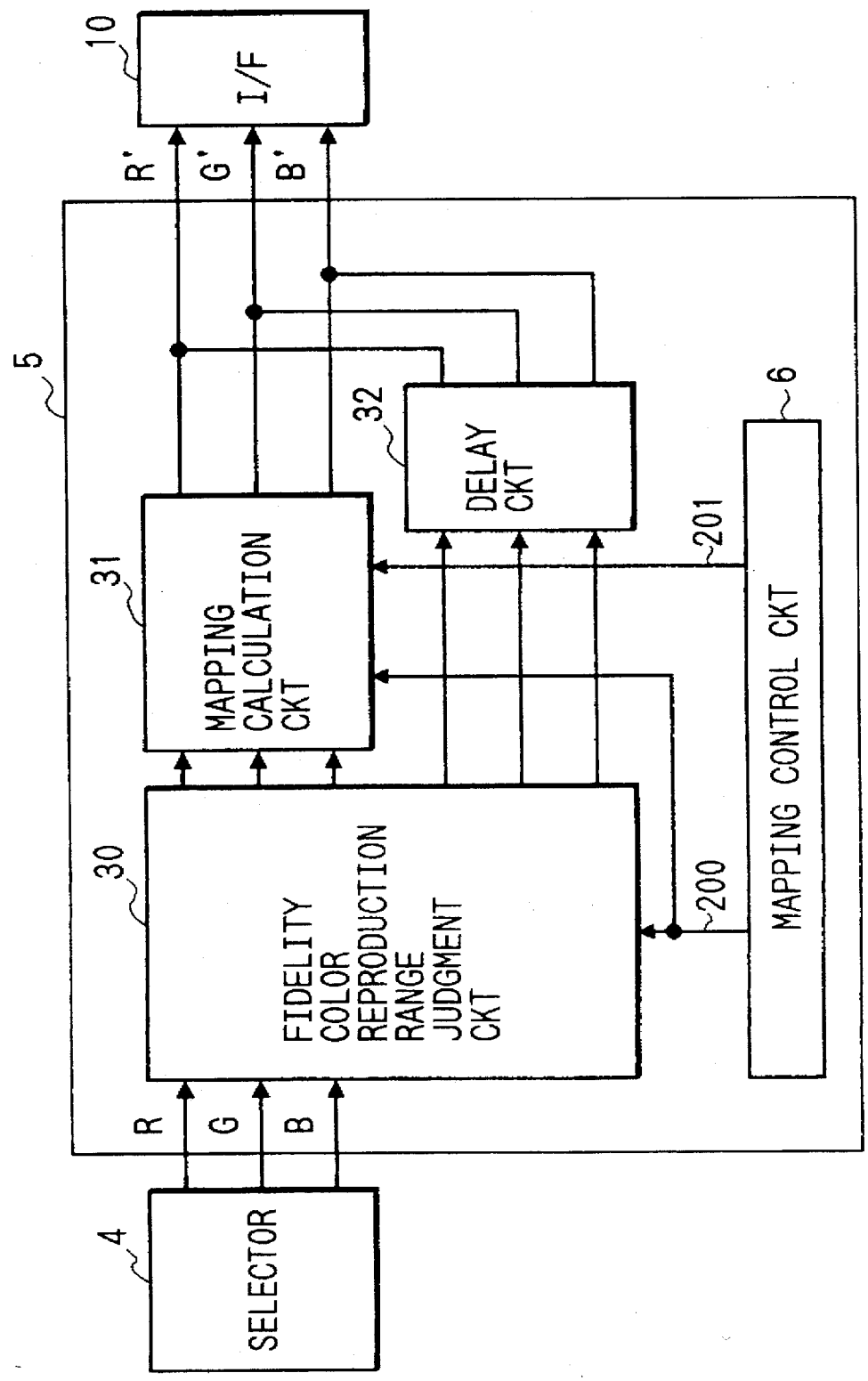
FIG. 9 is a block diagram showing a construction of a mapping circuit 5 shown in FIG. 7.

FIG. 9 is a block diagram showing the details of the mapping circuit 5.

A fidelity color reproduction range judgment circuit 30 discriminates whether the input absolute position color signals exist within the fidelity color reproduction area or not on the basis of the mapping boundary data 200 from the mapping control circuit 6. If YES, those color signals are directly supplied to the interface 10. When the color signals are out of the fidelity color reproduction area, they are supplied to a mapping calculation circuit 31. The mapping calculation circuit 31 obtains the relative positions in which the fidelity color reproduction area is set to a reference on the basis of the mapping boundary data 200 that is input with respect to the absolute position color signals which are input from the judgment circuit 30. A relative position P' after mapping is obtained by a calculation circuit for executing the equation (1,4) by using the relative position and the mapping coefficient data 201 that is input. The relative position P' is subjected to an absolute position conversion and is output to the interface 10 as pixel data R', G', and B' after completion of the color mapping. A delay circuit 32 is a circuit for delaying the absolute position color signals which are input from the judgment circuit 30 by a time that is required for the calculations in the mapping calculation circuit 31 and is constructed by, for example, a line memory.

[Third embodiment]

A case of embodying the foregoing image processing method by using another hardware will now be described as a third embodiment.

FIG. 10 is a block diagram showing an example of a schematic internal construction of a system for embodying the color space compressing method according to the invention. The system of the embodiment comprises: the image input device 1; the image output device 11; an image processing apparatus 101; and a computer 13.

In the image processing apparatus 101, reference numeral 2 denotes the interface to receive the input color signals from the image input device 1 and 41 a mapping memory for mapping the input color signals on the basis of color space compression parameters which are input from an interface 42 and for generating the mapped signals. The mapping memory 41 comprises, for instance, a RAM and a CPU. Reference numeral 10 denotes the interface for transmitting the input color signals after completion of the mapping to the image output device and 42 indicates the interface to receive the mapping data from the computer.

The computer 13 has previously stored the profile information of the image output device in an internal memory. The computer 13 decides the mapping boundary according to the feature of the input color signals on the basis of the input color signals received from the image processing apparatus 101 and the device color reproduction area included in the profile information and calculates and obtains the mapping boundary data and the mapping coefficient and transmits them to the image processing apparatus 101.

Since the calculations regarding the mapping process are distributed and executed by the computer and the image processing apparatus, therefore, the load of the image processing apparatus can be reduced.

The invention is not limited to the foregoing embodiments but can be also applied to another construction such that the computer 13 forms data regarding a lookup table (LUT) for making the input color signals correspond to the data after completion of the mapping and transmits such data to the image processing apparatus 101 and an LUT is formed in the mapping memory.

It is also possible to construct such that the image output device holds the profile information and the profile information is transferred to the computer by protocols of the computer 13 and the image output device.

Consequently, the computer doesn't need to store the profile information in correspondence to the image output device. A memory capacity can be saved.

In each of the above embodiments of the invention, although the (L, a, b) color space and (R, G, B) color space of the CIE have been used, color spaces such as (L, u, v), (Y, I, Q), etc. of the CIE can be also used.

The number of pixels out of the device color reproduction area of the counting means and the maximum relative position of the mapping coefficient determining means of the embodiment can be also obtained by sampling the input signal without obtaining from all of the input color signals.

The mapping method is also not limited to the linear color space compression like the equation (1,4) but may be also a non-linear color space compression.

The value of the foregoing special color signal is not limited to Pbrmax but may be also set to an arbitrary value so long as it indicates the feature of the input image such as a color signal of the maximum frequency or the like.

In the above embodiments of the invention, the above image processes have been executed with respect to one frame as a target. However, for example, in the case where several images of different features such as photographs, documents, etc. mixedly exist in one frame, the area is divided into small areas and the above image processes can be also executed every divided area.

Although the above embodiments have been described with respect to the system comprising the external input device 1, image processing apparatus 101, and image output device 11, the invention is not limited to such a system but can be also applied to an apparatus comprising one equipment.

The invention can be also accomplished by supplying a program to a system or an apparatus.

As a specific image output device, it is also possible to use a device for forming a latent image onto a recording medium by a monitor, a printer, or an electrophotographic system.

As an image output device, it is also possible to use a recording apparatus using a head of the type such that a liquid droplet is ejected by causing a film boiling by a thermal energy.

As mentioned above, according to the above embodiments, by controlling the mapping boundary on the basis of the input color signals, a good color image can be reproduced while keeping the color continuity even in an area out of the device color reproduction area.

According to the above embodiments, by controlling the mapping boundary in accordance with the number of pixels out of a predetermined color space among the input color signals, the mapping boundary can be certainly controlled.

Further, according to the above embodiments, by controlling the mapping boundary on the basis of the value of the special input color signal, the mapping can be performed in accordance with the feature of the input image.

The present invention is not limited to the foregoing embodiments but many modifications and variations are possible within the spirit and scope of the appended claims of the invention.

What is claimed is:

1. An image processing method comprising:

a judging step of judging whether input color signals exist in a predetermined color space area;

a counting step of counting a number of pixels associated with the input color signals judged by said judging step to exist outside of said predetermined color space area;

setting an area to reproduce the input color signals at a high fidelity in a color reproducible area of a processing device to a fidelity color reproduction area, and setting an area to map input color signals out of said fidelity color reproduction area to a mapping color reproduction area;

a mapping control step of controlling a mapping boundary as a boundary of the two set areas in accordance with a count value of said counting step; and a mapping step of mapping said input color signals on the basis of said mapping boundary.

2. A method according to claim 1, further comprising an input step of inputting said input color signals.

3. A method according to claim 1, further comprising an image output step of outputting an image.

4. A method according to claim 1, wherein said predetermined color space area is a device color reproduction area of image output means.

5. A method according to claim 1, wherein said mapping control step controls color gamut mapping processing for each object image included in an input image.

6. An image processing method whereby an area to reproduce input color signals at a high fidelity in a color reproducible area of a processing device is set to a fidelity color reproduction area and an area to map said input color signals out of said fidelity color reproduction area is set to a mapping color reproduction area, said method comprising:

a mapping step of mapping the input color signals judged to exist outside of a mapping boundary between the two set areas to said mapping color reproduction area on the basis of a position of the mapping boundary and a value of a special input color signal indicative of a feature of an input image.

7. A method according to claim 6, further comprising an input step of inputting said input color signals.

8. A method according to claim 6, further comprising an image output step of outputting an image.

9. A method according to claim 6, wherein said special input color signal indicative of the feature of said input image is detected by standardizing the input color signals by setting a device color reproduction area to a reference value.

10. A method according to claim 6, wherein the position of said mapping boundary is determined on the basis of the number of input color signals outside of said device color reproduction area.

11. A method according to claim 6, wherein said mapping step controls color gamut mapping processing for each object image included in an input image.

12. An image processing method comprising:
an estimating step of estimating a number of pixels outside of a predetermined color space area;
a controlling step of controlling an area in a color reproducible area of an output device to reproduce input color signals at a predetermined fidelity on the basis of the number of pixels estimated in said estimating step; and
a mapping step of mapping the input color signals into the color reproducible area on the basis of the area controlled in said controlling step.

13. A method according to claim 12, wherein said controlling step controls a mapping boundary, the mapping boundary comprising a boundary between the area to reproduce the input color signals at a predetermined fidelity and a color gamut of the output device, such that the mapping boundary is set to a fidelity color reproduction area and such that an area to map the input color signals out of a fidelity color reproduction area is set to a mapping color reproduction area.

14. A method according to claim 12, wherein said controlling step controls color gamut mapping processing for each object image included in an input image.

15. A method according to claim 12, wherein the predetermined color space area includes the color reproducible area.

16. An image processing method in which a communicating means communicates with an external output device, said method comprising the steps of:
inputting image data;
calculating a color correction parameter for the image data on the basis of the image data and profile information of the external output device; and
outputting the color correction parameter to the external output device,
wherein the external output device performs color space compression on the image data on the basis of the color correction parameter.

17. An image processing apparatus comprising:
judging means for judging whether input color signals exist in a predetermined color space area;
counting means for counting the number of pixels associated with said input color signals judged by said judging means to exist outside of said predetermined color space area;
setting means for setting an area to reproduce the input color signals at a high fidelity in a color reproducible area of a processing device to a fidelity color reproduction area and an area to map the input color signals out of said fidelity color reproduction area to a mapping color reproduction area;
mapping control means for controlling a mapping boundary between the two set areas in accordance with a count value of said counting means; and
color mapping means for mapping said input color signals on the basis of said mapping boundary.

18. An image processing apparatus wherein an area to reproduce input color signals at a high fidelity in a color reproducible area of a processing device is set to a fidelity color reproduction area and an area to map the input color signals out of said fidelity color reproduction area is set to a mapping color reproduction area, said apparatus comprising:
mapping means for mapping the input color signals judged to exist outside of a mapping boundary between the two set areas to said mapping color reproduction area on the basis of a position of the mapping boundary and a value of a special input color signal indicative of a feature of an input image.

19. An image processing apparatus comprising:
estimating means for estimating a number of pixels outside of a predetermined color space area;
controlling means for controlling an area in a color reproducible area of an output device to reproduce input color signals at a predetermined fidelity, said controlling means controlling the area on the basis of the number of pixels estimated by said estimating means; and
mapping means for mapping the input color signals into the color reproducible area on the basis of the area controlled by said controlling means.

20. An image processing apparatus having communication means which communicates with an external output device, comprising:
first input means for inputting image data;
calculating means for calculating a color correction parameter for said image data on the basis of the image data and profile information of said external output device; and
output means for outputting said color correction parameter to said external output device,
wherein the external output device performs color space compression on the image data on the basis of the color correction parameter.

21. An apparatus according to claim 20, wherein said color correction parameter is a parameter related to a color space compression.

22. An apparatus according to claim 20, wherein said profile information includes data indicative of a color reproduction range of said external output device.

23. An apparatus according to claim 21, wherein said parameter related to said color space compression is a mapping coefficient.

24. An apparatus according to claim 21, wherein said external output device uses a head which ejects a liquid droplet via film boiling.

25. An apparatus according to claim 20, wherein the color correction parameter is stored in a look-up table (LUT) used to color correct input image data and output color corrected image data.

* * * * *

UNITED STATES PATENT AND TRADEMARK OFFICE
CERTIFICATE OF CORRECTION

PATENT NO. : 5,712,925

DATED : January 27, 1998

INVENTOR : Manabu Ohga

It is certified that error appears in the above-identified patent and that said Letters Patent is hereby corrected as shown below:

<u>COLUMN 4</u>

Line 62, "a" should read --$\alpha$--.

<u>COLUMN 5</u>

Line 9, "a" should read --$\alpha$--.

<u>COLUMN 6</u>

Line 7, "(1,1,)," should read --(1,1),--.

Line 15, "(1,1,)," should read --(1,1),--.

<u>COLUMN 7</u>

Line 19, "(1,1,)." should read --(1,1).--.

<u>COLUMN 8</u>

Line 30, "a" should read --$\alpha$--.

UNITED STATES PATENT AND TRADEMARK OFFICE
CERTIFICATE OF CORRECTION

PATENT NO. : 5,712,925
DATED : January 27, 1998
INVENTOR : Manabu Ohga

Page 2 of 2

It is certified that error appears in the above-identified patent and that said Letters Patent is hereby corrected as shown below:

<u>COLUMN 12</u>

Line 65, please add:

--26. A method according to Claim 16, wherein the profile information includes information representing a color reproduction gamut of the external output device.

27. A method according to Claim 16, wherein the color correction parameter is a mapping coefficient to be used in the color space compression.--

Signed and Sealed this

Twenty-eighth Day of July, 1998

*Attest:*

BRUCE LEHMAN

*Attesting Officer*  *Commissioner of Patents and Trademarks*